United States Patent [19]

Irwin et al.

[11] Patent Number: 4,666,071

[45] Date of Patent: May 19, 1987

[54] BICYCLE REAR CARRIER RACK

[75] Inventors: David Irwin, Newtown; Mark T. La Plante, Ridgefield; David R. Graham, Danbury, all of Conn.

[73] Assignee: Cannondale Corporation, Georgetown, Conn.

[21] Appl. No.: 822,772

[22] Filed: Jan. 24, 1986

[51] Int. Cl.[4] .............................................. B62J 7/00
[52] U.S. Cl. .................................... 224/39; 224/32 A
[58] Field of Search ................ 224/30 R, 32 A, 32 R, 224/39, 38

[56] References Cited

U.S. PATENT DOCUMENTS

| | | | |
|---|---|---|---|
| 1,547,671 | 7/1925 | Mathews | 224/39 |
| 4,258,870 | 3/1981 | Edelson | 224/39 X |
| 4,328,914 | 5/1982 | Michaud | 224/32 A X |
| 4,353,490 | 10/1982 | Jackson et al. | 224/39 X |
| 4,383,625 | 5/1983 | Kiang | 224/39 |
| 4,537,338 | 8/1985 | Belka | 224/39 |

Primary Examiner—James E. Bryant, III
Assistant Examiner—Robert M. Petrik
Attorney, Agent, or Firm—Brumbaugh, Graves Donohue & Raymond

[57] ABSTRACT

A rear carrier rack for a bicycle comprises spaced-apart side members, each of which includes a horizontal portion and an L-shaped portion, an inverted U-bar, an inverted V-bar and a plurality of cross pieces, of which one between the two horizontal portions of the side members supports a pair of adjustable connecting bars and a locking mechanism for such bars. The free ends of the two bars and the two points where the free ends of the V-shaped and U-shaped bars meet serve as the four attachment points of the rack to the bicycle.

6 Claims, 7 Drawing Figures

BICYCLE REAR CARRIER RACK

FIELD OF THE INVENTION

This invention relates to a rear carrier rack for a bicycle.

BACKGROUND OF THE INVENTION

Many bicycle owners equip their bicycles with a rear carrier rack. Experienced bicycle riders know that a rear carrier rack must be as rigid and as rigidly attached to the bicycle as possible, lest a load carried on the rack sway from the side to side and make it more difficult to control the bicycle. A swaying load will require the rider to be much more attentive to steering and balance than he or she otherwise would be, and the rider will tire much more quickly which riding a bicycle with a heavy load that sways from side to side. Many bicycle rear carrier racks on the market today are not sufficiently strong and not adequately secured to the bicycle to prevent substantial swaying, even with comparatively light loads. When the rack carries loaded panniers, sleeping bags and other articles required for bicycle touring, it is virtually essential that the bicyclist have a very rigid high quality carrier rack.

To minimize sway, it has been known to include in the frame design V-shaped bars and anti-sway struts to stiffen the frame and reduce the tendency to sway. Additionally, it has been known to use a U-shaped strut that is attached to the rear dropouts of the bicycle.

An additional problem that is faced with rear carrier racks is the provision of attachment points for supporting the packs or panniers to the rack that will ensure stable and secure support even for them.

Still another problem is the need to simplify the connections of the carrier rack to the bicycle.

SUMMARY OF THE INVENTION

The present invention provides a rear carrier rack which embodies several improvements in solving the various problems described. Not only is it sturdy, stiff and highly resistant to sway but it also provides for well-located attachment points for panniers that results in secure and stable support. Additionally, the invention provides for four attachment points of the rack to the bicycle which is another characteristic generally viewed as desirable, and though known per se (see, for example U.S. Pat. No. 4,429,818), is accomplished in a novel and effective way. In particular, in another aspect of the invention there is provided a novel mechanism that permits locking the position of a pair of longitudinally extending front connecting bars by tightening only a single bolt. This mechanism is used to advantage in the present invention to lock in the desired position each of a pair of connecting bars used to make two of the rack attachments to the bicycle.

In accordance with one aspect of the invention, a rear carrier rack comprises a load-supporting platform formed by a pair of spaced-apart side portions, each of which includes a horizontal member that at its forward end turns inward to merge with the inwardly turning end of the other member and at its rear end turns first vertically downward and then horizontally forward to form an L-shaped anti-sway strut which butts and forms a junction with an essentially vertical leg of an inverted U-shaped bar at a point above the end of such leg. A crosspiece is connected between the two vertical leg portions of the L-shaped portions below the platform level, and an inverted V-bar has its vertex connected to the center of this crosspiece and its legs connected to the respective horizontal leg portions of the L-shaped portions at points near their ends.

The ends of the V-shaped bar and the ends of the U-shaped bar each have holes, and each pair formed by one end from each bar overlaps with the holes in register and serves as one of two lower attachments points to the bicycle, advantageously to the two rear dropouts of the bicycle. Preferably, the rack is constructed from tubular members, in which case durable lower attachment points are provided by inserting cylindrical plugs into the ends of the V-shaped and U-shaped bars, then flattening each of them into a solid, flat tip, and stamping the holes after the rack is assembled. The two upper attachment points are provided by a pair of front connecting bars designed for connection to the seat stays of the bicycle, and these connecting bars are supported by a crosspiece between the two horizontal members of the platform.

The lower ends of the U-shaped and V-shaped bars at each side of the rack form with the lower horizontal leg portion of each L-shaped member a triangulated sub-structure. This sub-structure provides a well-bounded limited region at each leading edge of the horizontal portion of each L-shaped bar which can serve as an ideal attachment point for a pannier.

According to a preferred embodiment of the connection bar aspect of the present invention, the position at which the front connector bars are connected to the rack platform is adjustable, and the connecting bars are locked in a chosen position by a novel locking mechanism which utilizes only one bolt to lock both bars simultaneously. The mechanism includes a wedging member into which the single bolt is threaded and the wedging member is inserted between a pair of clamping members so shaped that as the bolt is tightened, the wedging member pushes outwardly against each of the clamping members to urge each clamping member to push sidewise on the adjacent connecting bar and to force it against a sidewall of a slot in a crosspiece of the platform which supports the bars and the locking mechanism, causing each bar to be securely clamped in place.

DESCRIPTION OF THE INVENTION

Figure 1:
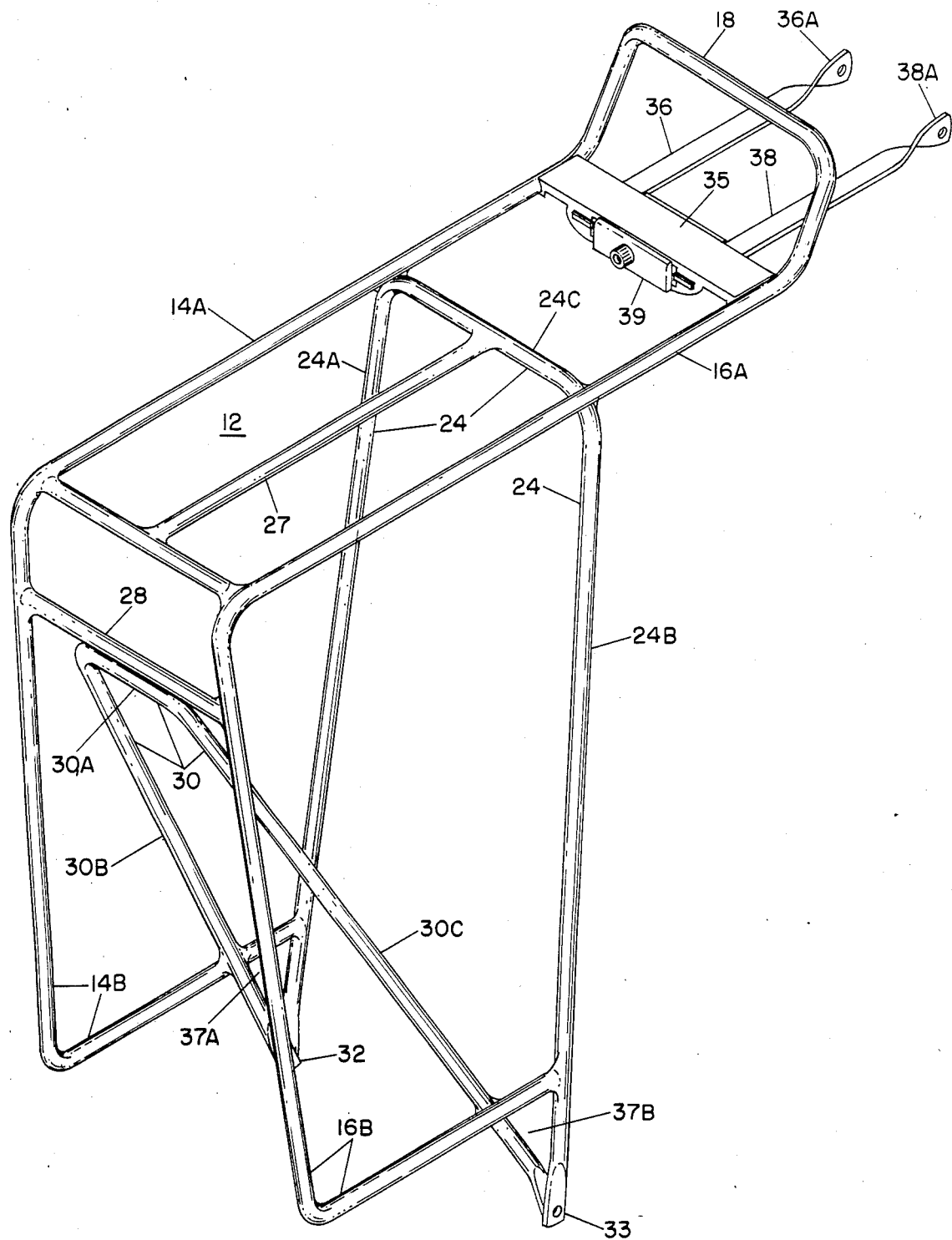
FIG. 1 is a perspective view of an embodiment of a bicycle rack in accordance with the invention.
Figure 2:
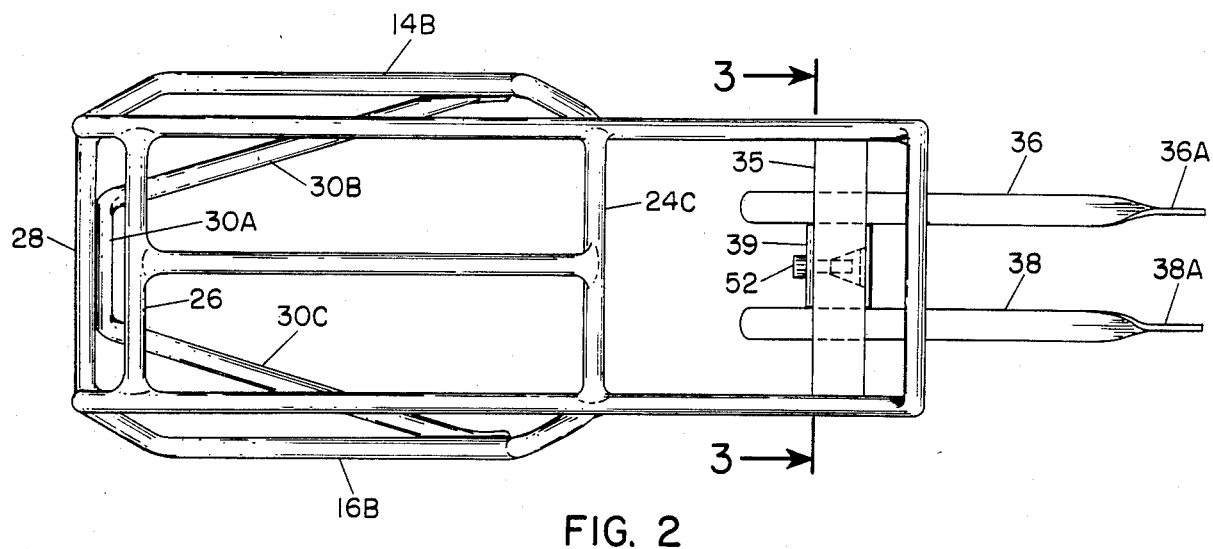
FIG. 2 is a top plan view of the embodiment shown in FIG. 1.

With reference first to FIGS. 1 and 2 of the drawings, the rack comprises a pair of generally parallel laterally spaced side members 14 and 16, each of which includes a generally horizontal upper portion 14A, 16A, the leading or forward end of which turns upward and then inwards to merge with the leading end of the other to form the crosspiece 18 merging the two portions 14A, 16A at the uppermost and leading portion of the rack. The portions 14A, 16A constitute the side, lengthwise components of the top platform, or deck, 12 of the rack.

Each of the members 14 and 16 further includes an L-shaped portion 14B, 16B that is a downwards continuation of the trailing end of a respective portion 14A, 16A. An inverted U-shaped member 24 is connected between the horizontal portions 14A, 16A and L-shaped portions 14B, 16B and comprises the substantially parallel vertical leg portions 24A, 24B and the horizontal portion 24C, which serves as a crosspiece between portions 14A and 16A, being joined thereto at a point about ⅓ of the distance between their leading and trailing ends. The leading ends of the horizontal legs of the L-shaped portions 14B, 16B are butt joined above the free ends of the legs 24A, 24B of the U-shaped member 24, advantageously at a point about one-sixth of the distance from the free ends to the junction with the horizontal members 14A, 16A.

A rear crosspiece 26 is connected between the two horizontal members 14A and 16A and is joined thereto at points near their trailing ends. A lengthwise platform member 27 extends between the centers of crosspieces 24C and 26. A crosspiece 28 is connected between the vertical legs of the L-shaped portions 14B, 16B at points approximately one-sixth of the vertical distance from their top ends to their bottom ends, preferably at a location to have only a small clearance from the rear tire. An inverted V-shaped member 30 has its vertex portion 30A joined to the underside of the crosspiece 28, advantageously along approximately its middle third portion, and its leg portions 30B and 30C are joined respectively to the horizontal lower legs of L-shaped portions 14B, 16B, the junctures advantageously being at points about one-fifth of the distance from the free ends of the slanted portions 30B, 30C to the vertex portion 30A and one-quarter the distance from the leading ends of the horizontal legs of L-shaped members 14B, 16B to the merger with their vertical legs. The two free lower ends of the legs 24A, 24B of the U-shaped member 24 coincide with the respective free ends of the legs 30B, 30C of the V-shaped member 30, and each is provided with a hole so that two pairs of aligned holes 32, 33 are formed at such ends. Each pair of holes 32, 33 is thereby adapted to form a separate attachment point to the bicycle. These attachments typically are to the two rear dropouts of the bicycle.

The various members of the frame advantageously are aluminum tubes for light weight and stiffness and the various joints are formed by welds for high strength. Strong and durable lower attachment points for the rack are produced by inserting aluminum plugs into the lower ends of the U-shaped and V-shaped members 24 and 30 and stamping them to provide solid flat tips. The attachment holes can be drilled or punched after the rack is assembled so that the holes line up or predrilled holes can be lined up during assembly.

Figure 3:
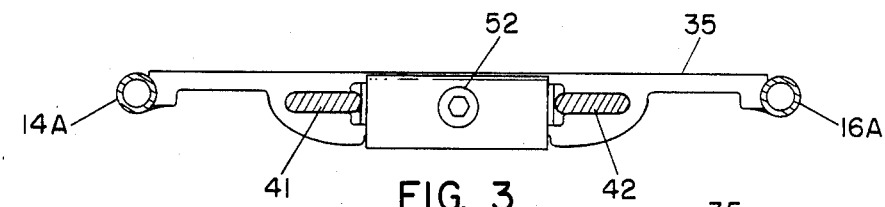
FIG. 3 is a rear cross-sectional view of the crosspiece and locking mechanism used to clamp the connection bars in the embodiment of FIG. 1, the section being taken generally along the lines 3—3 of FIG. 2.
Figure 7:
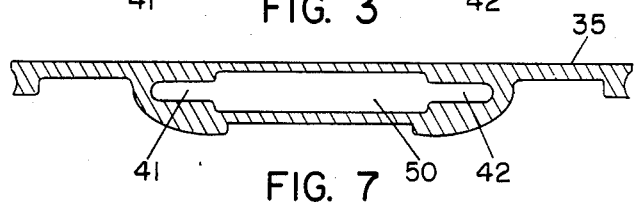
FIG. 7 is an end elevational view of the crosspiece for the locking mechanism.
Figure 4:
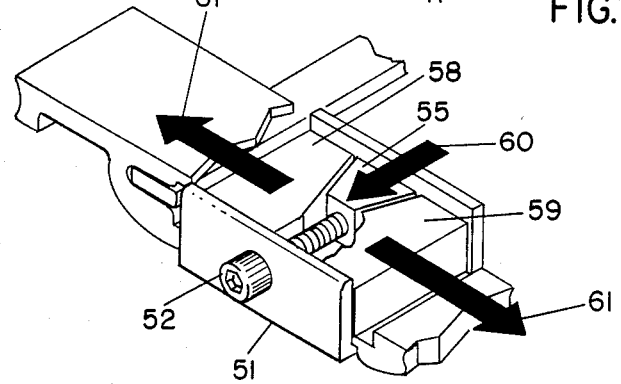
FIG. 4 is a perspective detail cutaway view of the locking mechanism of FIG. 3.
Figure 5:
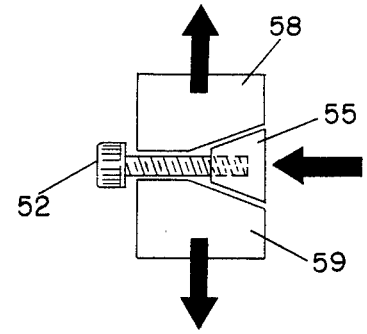
FIG. 5 is a top plan view of the moving components of the locking mechanism.
Figure 6:
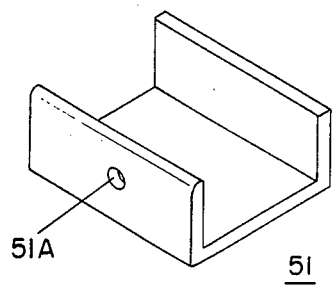
FIG. 6 is a perspective view of the retainer used in the locking mechanism.

Located near the front of the rack platform between the horizontal members 14A and 16A just before they turn upward and inward preliminary to merging is a crosspiece 35 which primarily serves to support a pair of laterally spaced-apart horizontal seat stay connecting bars 36 and 38 and an adjustable locking mechanism 39. Each connecting bar 36, 38 is a metal band having a width substantially greater than its thickness and is received flatwise in a slot 41, 42 in the crosspiece 35. As best seen in FIGS. 3 and 7, each of the slots 41, 42 is shaped generally to match the cross sectional shape of the bar 36, 38 but is sufficiently wide to allow the bar to be slid longitudinally fore and aft with respect to the platform 12. The front end portion 36A, 38A, respectively, of each of bars 36 and 38 is twisted about 90° generally about the longitudinal axis of the bar, thereby orienting that portion to be substantially flatwise with respect to the seat stay (not shown) of the bicycle. The front end of the twisted portion has a hole to permit connection to the seat stay in known fashion either by an offset ring clamp (See U.S. Pat. No. 4,429,818) or directly to bosses on the seat stays which some bicycles have.

One feature of the invention is a novel arrangement for permitting easy adjustment of the longitudinal position of the connecting bars 36, 38 in the crosspiece 35 for securing the ends 36A, 38A of the connecting bars and for locking the two bars in position after the adjustment is made. The adjustment of the bars (known per se) allows the rack to fit a variety of sizes of bicycles made by various manufacturers. This arrangement involves a locking mechanism 39 which is centrally supported on the crosspiece 35 intermediate between the regions where the bars pass through the crosspiece. The details of the mechanism 39 will be described in greater detail later in connection with FIGS. 4 to 7.

There are several features in the rack described so far that serve to distinguish it and which provide special advantages.

Each of the L-shaped portions 14b, 16b is strongly integrated into the frame structure where it butts to the two legs of the U-shaped bar 24, where it passes over and is joined to the legs of the V-shaped bar 30, and where it is joined to the respective end of the crosspiece 28. This arrangement provides a triangular sub-structure for rigid support of each L-shaped portion 14B, 16B so that it can function well in its intended role of providing a backup for the lower and trailing portions of the back wall of a pannier. Preferably, the pannier will be designed to provide two lower attachment points along the bottom horizontal legs of the respective L-shaped portions 14B, 16B.

The V-shaped bar 30 is connected to the crosspiece 28 at a level below the level of the top platform. Thus the effective length of each leg of the V-bar is shortened, increasing its stiffness and ability to prevent sway. Moreover, the legs 30B and 30C are joined to L-shaped members 14B, 16B above the rear dropouts at the triangular sub-structure, further reducing their effective length as far as bending is concerned. The triangulated sub-structures 37A, 37B around the dropouts are very stiff and rigidly fastened to the bicycle. The crossbar 28 can be located fairly close to the rear tire. In summary the V-shaped anti-sway strut 30 is capable of minimizing sway of the rear part of the rack because the legs 30B, 30C are comparatively short. Furthermore, portions of the lateral forces caused by the tendency of the load on the rack to sway are borne by the L-shaped portions 14B, 16B—i.e., the lateral forces are shared by the members 30, 14B and 16B, which are joined together at lower and upper junctures. The triangular sub-structures 37A, 37B between the crossing points and the ends where the L-shaped bar joins the U-shaped bar that can serve as attachment points where an attachment hook for a pannier can be located with limited freedom for fore and aft movement. By using this attachment point along with another attachment point spaced-apart along the horizontal leg of each L-shaped portion 14B, 16B, together with two attachment points spaced apart along the horizontal portions 14A, 16A of the platform, there are provided four points for attachment of hooks for a pannier that result in an attachment that is highly stable and secure, generally able to withstand even an overturn of the bicycle, particularly when used with the Tour-Lock TM pannier mounting system manufactured by Cannondale Corporation.

Referring now to FIGS. 3 to 7 of the drawings, the adjusting mechanism for the seat stay connecting bars 36 and 38 of the rack includes a U-shaped retainer 51 that fits under the cross piece 35 with its leg portions extending up and covering a longitudinal opening 50 in the cross piece 35 to form an enclosure, which enclosure extends between and merges with the slots 41 and 42 in the cross piece that receive the respective connecting bars 36 and 38. A screw 52 passes freely through a hole 51A in one leg of the retainer 51 and is threaded into a wedge member 55 that is received within the opening 50. The side wedge or tapered surfaces of the member 55 bear against corresponding wedge surfaces on a pair of clamping blocks 58 and 59 received within the opening 50 on opposite sides of the wedge member 55 and loosely contained in the enclosure by the legs of the retainer 51.

When the screw is loosened such that the wedge member 55 is in its forwardmost position, relative to the clamping blocks 58 and 59, the blocks are able to move toward each other and thereby be positioned out of engagement with the inwardly facing edges of the connector bars 36 and 38, thus enabling the connecting bars to be adjusted fore and aft to permit the carrier rack to be oriented on the bicycle frame in the desired horizontal position of the platform. By tightening the screw 52, the wedge member 55 is moved in the direction of the arrow 60 (FIG. 4) and drives the clamping blocks 58 and 59 (the arrows 61) away from each other and into engagement with the connecting bars. Thus by the simple act of tightening a single screw, both connecting bars are firmly clamped in the receiving slots 41 and 42 in the cross piece 35. It will be readily apparent to those skilled in the art that the shapes of the wedge member and clamping blocks can vary considerably from that shown and still fulfill the clamping function provided by the wedging or camming action.

Advantageously, for light weight, ease of manufacture and resistance to rust, the components of the locking assembly other than the screw and wedge members are fabricated from aluminum. In the case of the cross piece, it can be produced economically by extruding stock to a cross-section corresponding to the end profile and then cutting the stock into pieces of the desired width. For durability, the screw and nut are best made of steel. The aluminum cross piece is readily welded to the aluminum frame.

We claim:

1. A rear carrier rack for a bicycle comprising a pair of spaced-apart side members, each including a horizontal portion forming a side element of a platform, and an L-shaped strut portion extending downwardly from the rearward end of the horizontal portion, an inverted U-shaped member including a horizontal base and a pair of substantially vertical side legs extending downwardly from the base, the base being joined to the two horizontal portions of the side members and forming a cross piece of the platform, the free ends of the two L-shaped portions of the side members being joined separately to the two vertical side legs of the U-shaped member above the free ends of the side legs of the U-shaped member, a cross brace extending between and joined to the two side members at points substantially below the platform and adapted to be in close clearance from a bicycle rear wheel, and an inverted V-shaped member having a base joined to the cross brace and a pair of legs whose respective free ends coincide with the free ends of the respective legs of the U-shaped member and each of which is joined to a corresponding L-shaped portion rearward of the free end thereof, whereby triangular sub-structures are formed by portions of the side members, U-shaped members and V-shaped members adjacent their junctures in the region of the free ends of the V-shaped members where the free ends of the legs of the U-shaped and V-shaped members coincide and where the legs of the V-shaped members are joined to the L-shaped portion.

2. A rack in accordance with claim 1 and further comprising a second crosspiece between the two side members forward of the first crosspiece, and a pair of laterally spaced-apart longitudinally extending connecting bars supported by the second crosspiece, the free ends of the two connecting bars forming two attachment points of the rack platform to the bicycle.

3. A rack in accordance with claim 1 in which the cross brace is joined to the vertical legs of the two L-shaped portions at points approximately one sixth the vertical distance from their top ends to their bottom ends.

4. A rack in accordance with claim 1 in which the legs of the V-shaped member are joined to the horizontal legs of the L-shaped portions at a point approximately one fifth the distance from the ends of the legs of the V-shaped member to the base and approximately one quarter the distance along the horizontal legs of the L-shaped portions from their free ends.

5. A rack in accordance with claim 2 in which the second crosspiece includes a releasable locking means for the connecting bars, said locking means comprising a pair of clamping blocks and a wedging member, and a screw threaded into the wedging member for pulling the wedging member against the clamping blocks, whereby the blocks are pushed against the sides of the connecting bars which are supported in slots in the crosspiece and the connecting bars are clamped against the bases of the slots.

6. A rack in accordance with claim 1 wherein the U-shaped and V-shaped members are formed of metal tubing, the free end of each leg of the U-shaped and V-shaped members contains a solid metal plug, and the free ends and plugs are forged into solid flat portions and have aligned holes adapted to serve as attachment points.

* * * * *